United States Patent
Dumitrescu et al.

(10) Patent No.: US 8,693,014 B2
(45) Date of Patent: Apr. 8, 2014

(54) JOB TICKET TRANSLATION IN A PRINT SHOP ARCHITECTURE

(75) Inventors: Tiberiu Dumitrescu, Simi Valley, CA (US); Michael Raines, Austin, TX (US)

(73) Assignee: Ricoh Company, Ltd, Tokyo (JP)

( * ) Notice: Subject to any disclaimer, the term of this patent is extended or adjusted under 35 U.S.C. 154(b) by 151 days.

(21) Appl. No.: 13/036,350

(22) Filed: Feb. 28, 2011

(65) Prior Publication Data

US 2012/0218577 A1  Aug. 30, 2012

(51) Int. Cl.
  *G06F 3/12*  (2006.01)
  *G06F 15/00*  (2006.01)
  *G06K 1/00*  (2006.01)

(52) U.S. Cl.
  USPC ............ 358/1.13; 358/1.15; 358/1.9

(58) Field of Classification Search
  None
  See application file for complete search history.

(56) References Cited

U.S. PATENT DOCUMENTS

| | | | |
|---|---|---|---|
| 6,573,910 B1 | 6/2003 | Duke et al. | |
| 6,825,943 B1 | 11/2004 | Barry et al. | |
| 7,051,328 B2 | 5/2006 | Rai et al. | |
| 7,065,567 B1 | 6/2006 | Squires et al. | |
| 7,079,266 B1 | 7/2006 | Rai et al. | |
| 7,099,027 B1 | 8/2006 | Barry et al. | |
| 7,125,179 B1 | 10/2006 | Rai et al. | |
| 7,148,985 B2 | 12/2006 | Christodoulou et al. | |
| 7,558,638 B2 | 7/2009 | Chang et al. | |
| 7,626,717 B2 | 12/2009 | Rai et al. | |
| 8,120,801 B2 | 2/2012 | Zhang et al. | |
| 8,259,321 B2 | 9/2012 | Zhang et al. | |
| 8,284,423 B2 | 10/2012 | Jahn et al. | |
| 8,427,670 B2 | 4/2013 | Rai | |
| 2001/0043346 A1* | 11/2001 | Roztocil et al. | 358/1.9 |
| 2002/0071134 A1 | 6/2002 | Jackson | |
| 2003/0041765 A1 | 3/2003 | Hill | |
| 2003/0061178 A1 | 3/2003 | Ogawa | |
| 2003/0167271 A1* | 9/2003 | Arnold et al. | 707/10 |
| 2003/0177082 A1 | 9/2003 | Buckwalter | |
| 2003/0212611 A1 | 11/2003 | Barrott et al. | |
| 2004/0006522 A1 | 1/2004 | Keane | |
| 2004/0068424 A1 | 4/2004 | Lee et al. | |
| 2004/0111430 A1 | 6/2004 | Hertling | |
| 2004/0184061 A1 | 9/2004 | Christiansen | |
| 2004/0196470 A1 | 10/2004 | Christiansen | |
| 2004/0196493 A1 | 10/2004 | Christiansen | |

(Continued)

FOREIGN PATENT DOCUMENTS

| EP | 1184779 A2 | 3/2002 |
|---|---|---|
| EP | 1320008 A2 | 6/2003 |
| EP | 1621995 A2 | 2/2006 |
| WO | WO 01/07997 A1 | 2/2001 |

*Primary Examiner* — Ming Hon
(74) *Attorney, Agent, or Firm* — Duft, Bornsen & Fettig LLP (57) ABSTRACT

Methods and systems are disclosed to provide conversions from job tickets submitted by clients to normalized tickets in a ticket standard used by the print shop. In one embodiment, a system receives a plurality of print jobs submitted by clients to a print shop. For each of the print jobs, the system identifies extension elements that describe services requested from the print shop. The extension elements are extensions to a job ticket standard used by the print shop. The system maps the extension elements to corresponding standard elements defined in the job ticket standard to generate normalized job tickets for the print shop. The system then transmits the normalized job tickets to a system of the print shop for generating workflows for the print jobs based on the normalized job tickets.

16 Claims, 9 Drawing Sheets

(56) References Cited

U.S. PATENT DOCUMENTS

| | | |
|---|---|---|
| 2005/0050466 A1* | 3/2005 | Sangroniz et al. ............ 715/526 |
| 2005/0065830 A1 | 3/2005 | Duke |
| 2005/0096770 A1 | 5/2005 | Chua et al. |
| 2005/0151993 A1 | 7/2005 | Gartstein |
| 2005/0154625 A1 | 7/2005 | Chua et al. |
| 2005/0248804 A1 | 11/2005 | Goel et al. |
| 2005/0275875 A1 | 12/2005 | Jennings, Jr. |
| 2006/0039026 A1 | 2/2006 | Lofthus et al. |
| 2006/0044597 A1 | 3/2006 | Dumitrescu et al. |
| 2006/0092467 A1 | 5/2006 | Dumitrescu et al. |
| 2006/0149755 A1 | 7/2006 | Marshall et al. |
| 2007/0070379 A1 | 3/2007 | Rai et al. |
| 2007/0091355 A1 | 4/2007 | Rai |
| 2007/0124182 A1 | 5/2007 | Rai |
| 2007/0177191 A1 | 8/2007 | Eschbach et al. |
| 2007/0185777 A1 | 8/2007 | Pyle et al. |
| 2007/0236708 A1 | 10/2007 | Jahn et al. |
| 2007/0242303 A1 | 10/2007 | Barry et al. |
| 2007/0247657 A1 | 10/2007 | Zhang et al. |
| 2007/0247659 A1 | 10/2007 | Zhang et al. |
| 2008/0137108 A1* | 6/2008 | Song et al. ..................... 358/1.6 |
| 2008/0144080 A1 | 6/2008 | Randt |
| 2008/0180728 A1 | 7/2008 | Sekine |
| 2008/0256541 A1 | 10/2008 | Rai |
| 2008/0285067 A1 | 11/2008 | Rai |
| 2009/0043628 A1 | 2/2009 | Gombert |
| 2009/0063710 A1 | 3/2009 | Sekine |
| 2009/0063718 A1 | 3/2009 | Sekine et al. |
| 2009/0109464 A1 | 4/2009 | Knodt |
| 2009/0244600 A1 | 10/2009 | Haycock |
| 2009/0251721 A1 | 10/2009 | Knodt |
| 2009/0279123 A1* | 11/2009 | Sekine ........................ 358/1.15 |
| 2009/0279124 A1* | 11/2009 | Liu et al. ..................... 358/1.15 |
| 2009/0279125 A1* | 11/2009 | Liu et al. ..................... 358/1.15 |
| 2009/0281862 A1 | 11/2009 | Conescu et al. |
| 2009/0282412 A1* | 11/2009 | Sekine et al. ................. 718/102 |
| 2010/0053657 A1 | 3/2010 | Weber |
| 2010/0060909 A1 | 3/2010 | Conescu et al. |
| 2010/0195140 A1 | 8/2010 | Shepherd |
| 2010/0231968 A1* | 9/2010 | Hirasawa et al. ............ 358/1.15 |
| 2010/0250267 A1 | 9/2010 | Brenner et al. |
| 2010/0259785 A1* | 10/2010 | Mori ........................... 358/1.15 |
| 2010/0321715 A1* | 12/2010 | Williams ..................... 358/1.13 |
| 2011/0075195 A1 | 3/2011 | Cain |
| 2011/0090529 A1* | 4/2011 | Hertling ...................... 358/1.15 |
| 2011/0170893 A1 | 7/2011 | Nishikawa |
| 2011/0199646 A1* | 8/2011 | Homma ....................... 358/1.15 |
| 2012/0057191 A1 | 3/2012 | Gnanasambandam |
| 2012/0092688 A1* | 4/2012 | Pangrazio, III .............. 358/1.13 |
| 2012/0188587 A1 | 7/2012 | Gaertner |
| 2012/0212771 A1 | 8/2012 | Goddard |

\* cited by examiner

```xml
<?xml version="1.0" encoding="UTF-8"?>
<JDF DescriptiveName="Print And Corner Stitch" ID="ID_20100406_092100"
JobPartID="1" MaxVersion="1.4" Status="Waiting" Type="Product"
Version="1.4" xmlns="http://www.CIP4.org/JDFSchema_1_1"
xmlns:xsi="http://www.w3.org/2001/XMLSchema-instance" xsi:type="Product">
<ResourceLinkPool>
<ComponentLink Amount="5" Usage="Output" rRef="OutputComponent"/>
<ColorIntentLink Usage="Input" rRef="ID_10434"/>
<LayoutIntentLink Usage="Input" rRef="ID_10438"/>
<ArtDeliveryIntentLink Usage="Input" rRef="ID_10486"/>
<MediaIntentLink Usage="Input" rRef="ID_10516"/>
<BindingIntentLink Usage="Input" rRef="binding1"/>
</ResourceLinkPool>
<ResourcePool>
<ArtDeliveryIntent Class="Intent" ID="ID_10486" Status="Available">
<ArtDelivery ArtDeliveryType="DigitalFile">
<RunListRef rRef="ID_20100488"/>
</ArtDelivery>
</ArtDeliveryIntent>
<BindingIntent Class="Intent"                              ← 712
DescriptiveName="Staple: Upper Left (slant)" ID="binding1" Status="Available">
<BindingSide Actual="Left" DataType="EnumerationSpan"/>    ← 714
<BindingType Actual="CornerStitch" DataType="EnumerationSpan"/>
</BindingIntent>                                              716
<ColorIntent Class="Intent" ID="ID_10434" Status="Available"/>
<Component Amount="1000" Class="Quantity"
ComponentType="FinalProduct" DescriptiveName="Green Sample"
ID="OutputComponent" Status="Unavailable"/>
<LayoutIntent Class="Intent" ID="ID_10438" Status="Available">
<FinishedDimensions DataType="ShapeSpan" Preferred="612 792 0"/>
</LayoutIntent>
<MediaIntent Class="Intent" DescriptiveName="WhiteSheet"
ID="ID_10516" Status="Available"/>
<RunList Class="Parameter" ID="ID_20100488" Status="Available">
<LayoutElement>
<FileSpec URL="Staple.pdf"/>
</LayoutElement>
</RunList>
</ResourcePool>
</JDF>
```

704

NORMALIZED JDF TICKET

FIG. 8

JOB TICKET TRANSLATION IN A PRINT SHOP ARCHITECTURE

FIELD OF THE INVENTION

The invention relates to the field of printing systems and, in particular, to normalizing job tickets submitted by clients of a print shop to a job ticket standard used by the print shop.

BACKGROUND

Print shops are typically medium or large scale facilities capable of supplying printing services to meet a variety of customer demands. For example, print shops are often used to print documents used for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. These printers may be managed by operators who can remove paper jams and reload the printers with media. Print shops also typically include post-print devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates activity between printers of the print shop and clients. The print server schedules incoming jobs and forwards them to the printers they are directed to.

Customers with printing needs generate print jobs for the print shop using a variety of tools, such as web interfaces to the print shop, client side tools operated by the customer, etc. When a customer generates a job for the print shop using a variety of different tools, job tickets for the print jobs may be generated in a variety of formats. The formats may be proprietary to a particular customer, software application generating the job ticket, etc. Print jobs include both print data and a job ticket. The job ticket describes the services requested by the customer from the print shop. For example, a job ticket may indicate duplexing, stapling, binding, or other types of services (both print and non-print) that the print shop will perform for the customer. Problems arise when the print shop receives job tickets in a variety of formats, as the print shop may be unable to accurately and efficiently provide the requested services to the customer.

SUMMARY

Embodiments described herein provide conversions from job tickets submitted by clients to normalized tickets in a ticket standard used by the print shop. Job tickets include information describing what services the clients are requesting from the print shop. The information in job tickets submitted by the clients may be extensions to, or outside of, the job ticket standard used by the print shop. In the embodiments described, normalized job tickets generated for the print shop are based on the job ticket standard used by the print shop and the job tickets submitted by the clients. The normalized job tickets are then provided to the print shop for generating workflows for jobs submitted by the clients. When the normalized job tickets are provided to the print shop, the shop operates more efficiently and with less operator intervention.

In one embodiment, a system includes a translation system and a submission system. The translation system receives a plurality of print jobs submitted by clients to a print shop. Each of the print jobs includes a corresponding job ticket. For each of the print jobs, the translation system identifies extension elements in a corresponding job ticket that describe services requested by a client. In this embodiment, the extension elements are extensions to a job ticket standard used by the print shop. The translation system maps the extension elements to corresponding standard elements defined in the job ticket standard to generate a normalized job ticket. The submission system then transmits the normalized job tickets to a system of the print shop for generating workflows for the print jobs based on the normalized job tickets.

In another embodiment, the translation system identifies fields in a corresponding job ticket that describe the services requested by a client. In this embodiment, the fields are in formats that are outside of a job ticket standard used by the print shop. The translation system maps the fields to corresponding standard elements defined in the job ticket standard to generate a normalized job ticket for the print shop.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIGS. 7A-7B are block diagrams illustrating an example of normalizing a client XML job ticket for a print request to a normalized JDF intent job ticket for the print request in an exemplary embodiment.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
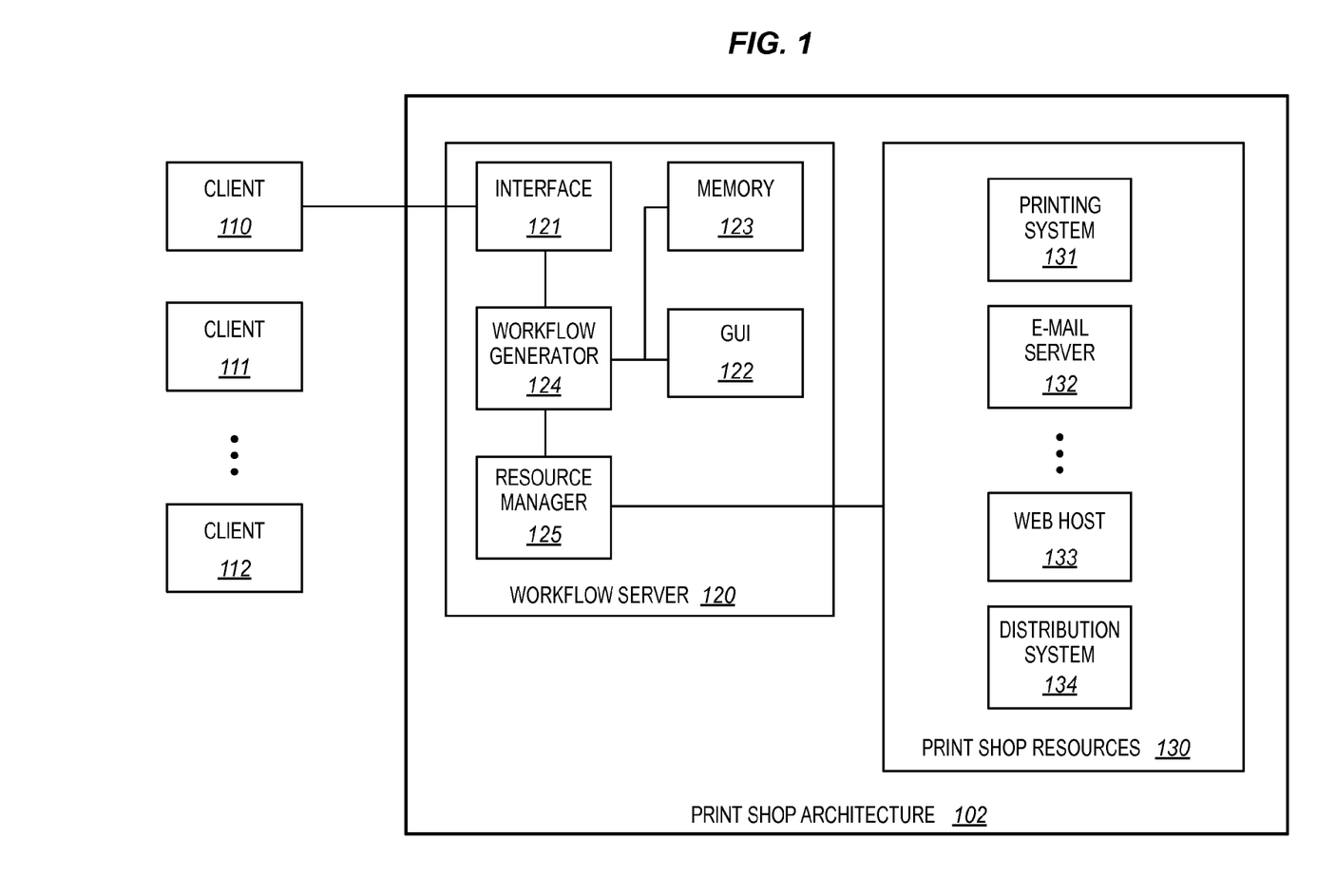
FIG. 1 is a block diagram illustrating a print shop architecture in an exemplary embodiment.

FIG. 1 is a block diagram illustrating a print shop architecture 102 in an exemplary embodiment. Print shop architecture 102 includes workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates custom workflows for incoming print jobs, and manages print shop resources 130 in accordance with these workflows. The custom workflows are generated based on rules defined for the customer, a job ticket of the print job, and activities available at the print shop.

Clients 110-112 may serve banks, credit card companies, or other customers having printing and document delivery needs (e.g., monthly bank statements, monthly credit card bills, etc.). Clients 110-112 may also serve customers with digital printing and publishing needs (e.g., needs for e-mail services, web publishing services, and others). Information describing the services requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, and others. Print shop resources 130 may exist within the confines of the print shop itself, or may comprise off-site devices and functional components managed by workflow server 120. The print shop resources 131-134 illustrated in FIG. 1 are merely meant to provide an example of the variety of print shop resources 130 that may be provided. For example, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies available activities that may be performed by print shop resources 130. Workflow server 120 may determine available print shop activities based upon the nature of print shop resources 130. For example, when print shop resources 130 include e-mail server 132, available activities may include generating e-mails, scheduling times to send e-mails, and selecting e-mail recipients. Activities may be associated with a category or type of resource (e.g., personnel, printers, servers) and may also be associated with specific named print shop resources (e.g., Susan, printing system 131, e-mail server 132).

Innumerable print shop activities may be defined, and certain print shop activities may be logically related with each other so that they have order and dependency relationships (e.g., a post-printing activity such as hole punching may depend upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., customer service requests, multimedia parameters, size of the print data, format of the print data, etc.). For example, thank-you letters may be sent to high value or long-term customers, while credit checks may be performed upon new customers. The logical relationships of print shop activities are hereinafter referred to as "print shop rules" or "rules. In addition to printing activities, rules may regulate non-printing activities (e.g., billing, shipping, document review, multimedia/digital/internet activities, credit checks, etc.). In order to aid an operator of the print shop in managing rules and activities, a Graphical User Interface (GUI) 122 is provided for generation and manipulation of activities and rules. Workflow server 120 stores rules for the print shop in memory 123.

Once rules and activities have been defined, workflow generator 124 is operable to generate a workflow for a print job of a customer. Workflow generator 124 generates the workflow based on information in a job ticket of the print job (e.g., customer service requests for printing or multimedia activities, the size of a print job, etc.) and the rules for the customer. The available activities are dynamically scheduled into the customized workflow to define an ordered set of activities to perform (including, for example, activities that run in parallel).

Resource manager 125 of workflow server 120 analyzes the generated workflow and directs print shop resources 130 to perform the activities defined by the workflow for a given print job. In one embodiment, resource manager 125 identifies activities that relate to specific print shop resources 131-134 (e.g., the activity "e-mail the client a printing status report" may relate to e-mail server 132), and instructs the specific resources to perform the identified activities. Resource manager 125 may further receive feedback from print shop resources 130 (e.g., information indicating that an activity has successfully completed).

Thus, while in operation, workflow server 120 receives and processes incoming print jobs from clients 110-112. Workflow server 120 determines the customer's service requests, and dynamically generates (i.e., "from scratch") a workflow of activities to perform in order to achieve the requested services for the customer while complying with the rules of the print shop. These dynamically generated workflows are customized to each incoming job. Workflow server 120 then initiates processing of the workflow for each job.

Figure 2:
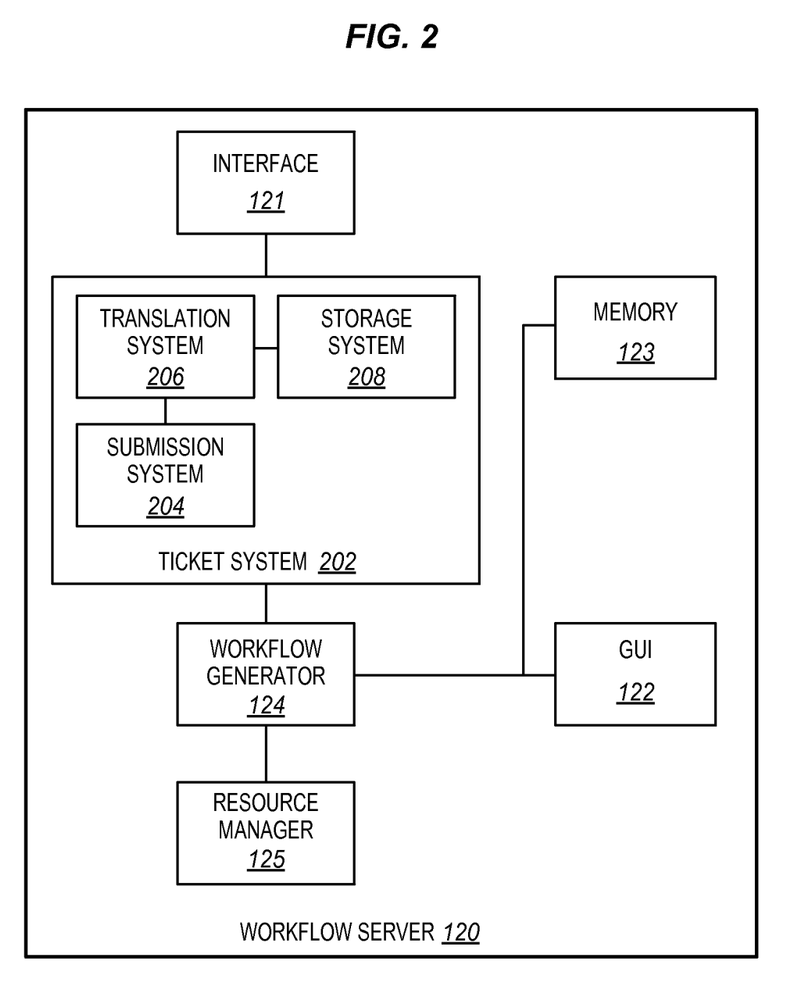
FIG. 2 is a block diagram illustrating additional details for the architecture of FIG. 1 in an exemplary embodiment.

FIG. 2 is a block diagram illustrating additional details for architecture 102 of FIG. 1 in an exemplary embodiment. In this embodiment, workflow server 120 includes a ticket system 202 coupled between interface 121 and workflow generator 124. Generally, system 202 receives a plurality of print jobs from clients 110-112 (e.g., via interface 121). Each of the print jobs includes a job ticket and may include print data. Information in the job tickets may be extensions to, or outside of, a job ticket standard used by architecture 102. System 202 converts the information in the job tickets to conform to the job ticket standard used by architecture 102. As a result, normalized job tickets for architecture 102 are generated. The normalized job tickets are then provided to workflow generator 124 for generating workflows for print jobs based on the normalized job tickets. The use of normalized job tickets allows workflow generator 124 to create workflows more efficiently, and with less intervention from a print operator due to the receipt of job ticket in a variety of formats.

System 202 in this embodiment includes a translation system 206 and a submission system 204. System 202 may also include a storage system 208 in some embodiments. These elements of system 202 will be discussed in more detail with regard to FIGS. 3-6.

Figure 3:
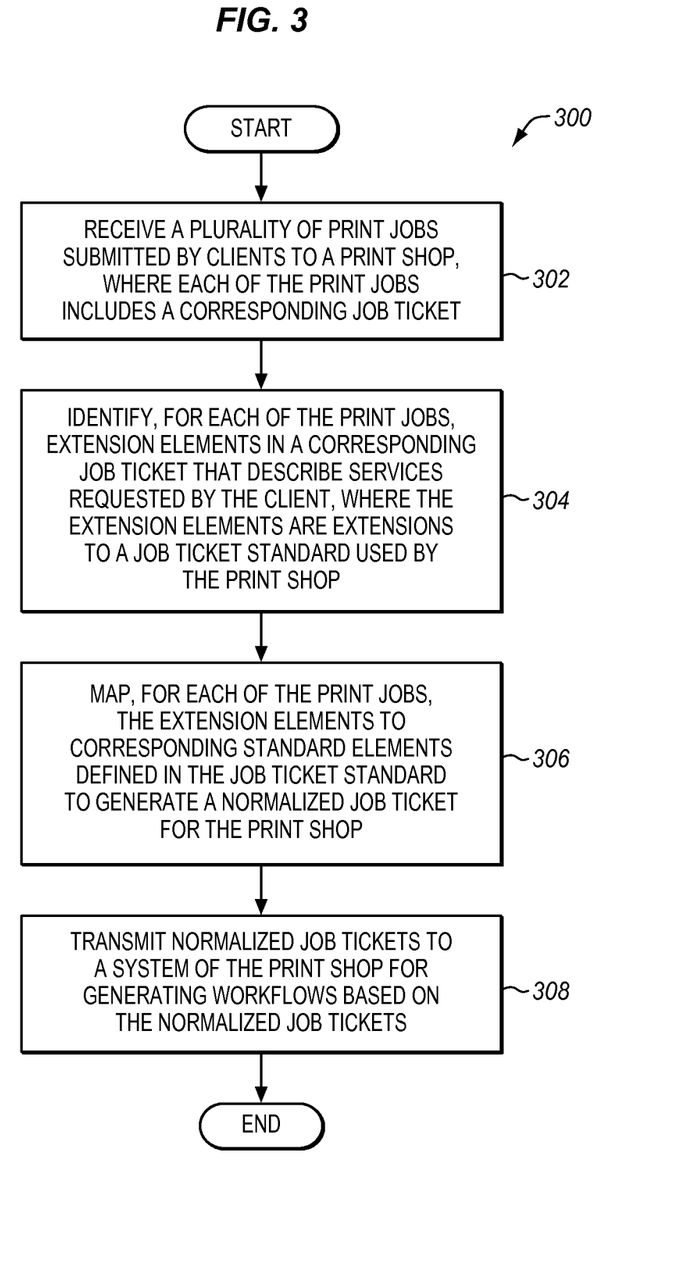
FIG. 3 is a flow chart illustrating a method of normalizing job tickets in an exemplary embodiment.

FIG. 3 is a flow chart illustrating a method 300 of normalizing job tickets in an exemplary embodiment. The steps of method 300 will be described with respect to system 202 of FIG. 2, although one skilled in the art will understand that method 300 may be performed by other systems not shown.

The steps of the methods described herein are not all inclusive and may include other steps not shown. The steps for the methods described herein may also be performed in an alternative order.

In step 302, translation system 206 receives a plurality of print jobs submitted by clients. Translation system 206 receives the print jobs from clients via interface 121. Each of the print jobs includes a job ticket, and may also include print data. Job tickets may be in a number of different formats, including Job Definition Format (JDF), Extensible Markup Language (XML), text, Portable Job Ticket Format (PJTF), binary, etc. A job ticket generally identifies what services clients are requesting from architecture 102. The requested services may be printing services, emailing services, shipping services, web publishing services, multimedia services, etc. Therefore, the job tickets in the embodiments described herein are not necessarily limited to just printing related services.

For the print jobs that are received, translation system 206 identifies in the print jobs extension elements in a corresponding job ticket that describe services requested by a client (step 304). In this embodiment, the extension elements are extensions to a job ticket standard used by architecture 102. In some embodiments, architecture 102 uses a JDF standard for job tickets. In JDF, a standardized form of XML (a schema) is used to describe services that architecture 102 is to perform. In XML, an element is a logical component of a document. The data within an element is referred to as the content of the element. Element content may also include child-elements, data, attributes, etc. Although JDF is a standard, customizable extensions to the standard allows customers to create their own elements as they wish. This can be problematic for print shops as the extension elements may lay outside of the JDF processing capabilities of the print shop.

Client job tickets may include any number of extension elements describing services requested by a client. Some of the services requested may include email services, shipping services, web publishing services, printing services, etc. Generally, an extension element may describe the services requested by clients from architecture 102 in an almost unlimited combination of ways. In this embodiment, the extension elements are extensions to a job ticket standard used by architecture 102. Thus, the extension elements may include any number of child-elements, data, attributes, etc., defined as extensions to the job ticket standard used by architecture 102.

In step 306, translation system 206 maps the extension elements from the received job ticket to corresponding standard elements defined in the job ticket standard. This mapping generates a normalized job ticket. After translations system maps the extension elements to standard elements defined in the job ticket standard, a normalized job ticket is the result. One of the extension elements may map to a plurality of standard elements.

As discussed, standard elements are defined in a job ticket standard used by architecture 102. When a normalized job ticket is generated, architecture 102 may process job tickets more efficiently and with less intervention from a print operator. In some embodiments, extension elements are mapped to standard elements based on the actual equipment available at architecture 102. For example, binding equipment used by architecture 102 may support only a subset of JDF elements defined in the JDF standard. Thus, system 202 may map extension elements related to binding activities to the subset of JDF elements that are specifically supported by a particular piece of binding equipment used by architecture 102. When the normalized job tickets are JDF job tickets, mapping a client's request for services (as described in the extension elements) to elements defined in JDF, generates a JDF intent for the client's job. In JDF there are two basic categories of job tickets—JDF intent and JDF process. Intent relates to what the client wants from a print shop, such as printing a document. Process relates to the actual resources assigned by the print to accomplish the intent, such as printing the document on the Ricoh printer at IP address 10.0.0.6.

After system 206 converts the received job tickets to normalized job tickets, submission system 204 transmits the normalized job tickets to a system of the print shop for generating workflows based on the normalized job tickets (step 308). For example, submission system 204 may transmit a job ticket to workflow generator 124. In a normalized format, workflow generator 124 may process the ticket to generate a workflow without further translation of the ticket 404.

Figure 4:
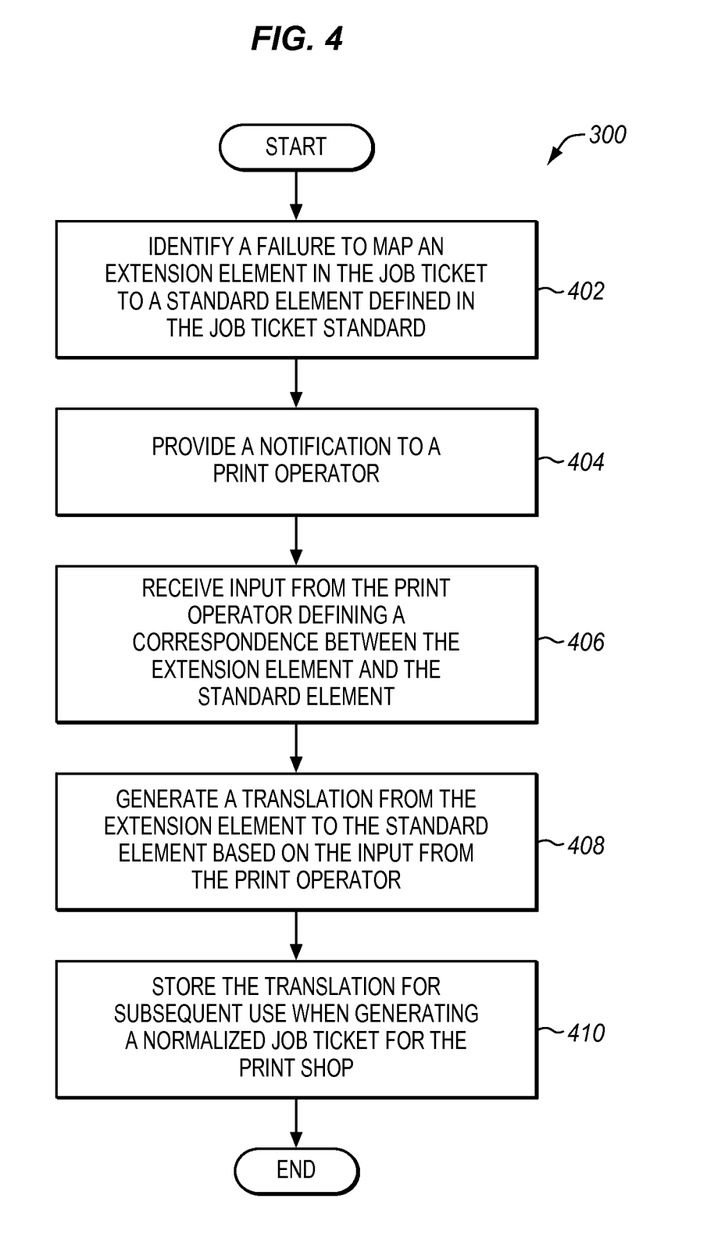
FIG. 4 is a flow chart illustrating additional details for the method of FIG. 3 in an exemplary embodiment.

FIG. 4 is a flow chart illustrating additional details for method 300 of FIG. 3 in an exemplary embodiment. The steps illustrated in FIG. 4 will be described with respect to system 202 of FIG. 2, although one skilled in the art will understand that the steps may be performed by other systems not shown.

In step 402, translation system 206 identifies a failure to map an extension element in the job ticket to a standard element defined in the job ticket standard. As extension elements are not defined in the job ticket standard, clients 110-112 may define the extensions in any manner that they wish. They may do so as a result of special types of processing requirements desired by clients 110-112, additional instructions for architecture 102, non-printing services that are requested and not defined by the job ticket standard, etc.

In step 404, translation system 202 provides a notification to a print operator indicating that a problem has occurred when attempting to normalize a job ticket from one or more clients 110-112. Translation system 206 may use GUI 122 of workflow server 120 to notify the print operator and receive input from the print operator.

In step 406, translation system receives input from the print operator (e.g., via GUI 122) defining a correspondence between the extension element and the standard element. Input from the print operator may be generated by allowing the print operator to use GUI 122 to drag and drop a representation of the problematic extension element onto a representation of a standard element defined in the job ticket standard used by architecture 102. Other input possibilities exist, of course, such as allowing the print operator to select a standard element from a drop down list of elements defined in the job ticket standard.

In step 408, translation system 206 generates a translation from the extension element to the standard element based on the input from the print operator. When the print operator indicates a correct mapping in step 506, translation system 206 uses this information to generate a translation that defines how the extension element relates to elements in the job ticket standard. Generating a translation allows architecture 102 to "learn" how to normalize job tickets in the future using the new translation.

In step 410, translation system 206 stores the translation in storage system 208 for subsequent use for generating a normalized job ticket for architecture 102. After storing the translation, translation system 206 may subsequently refer to the stored translation when normalizing job tickets. This allows system 202 to reduce the amount of interaction from the print operator in the future.

Figure 5:
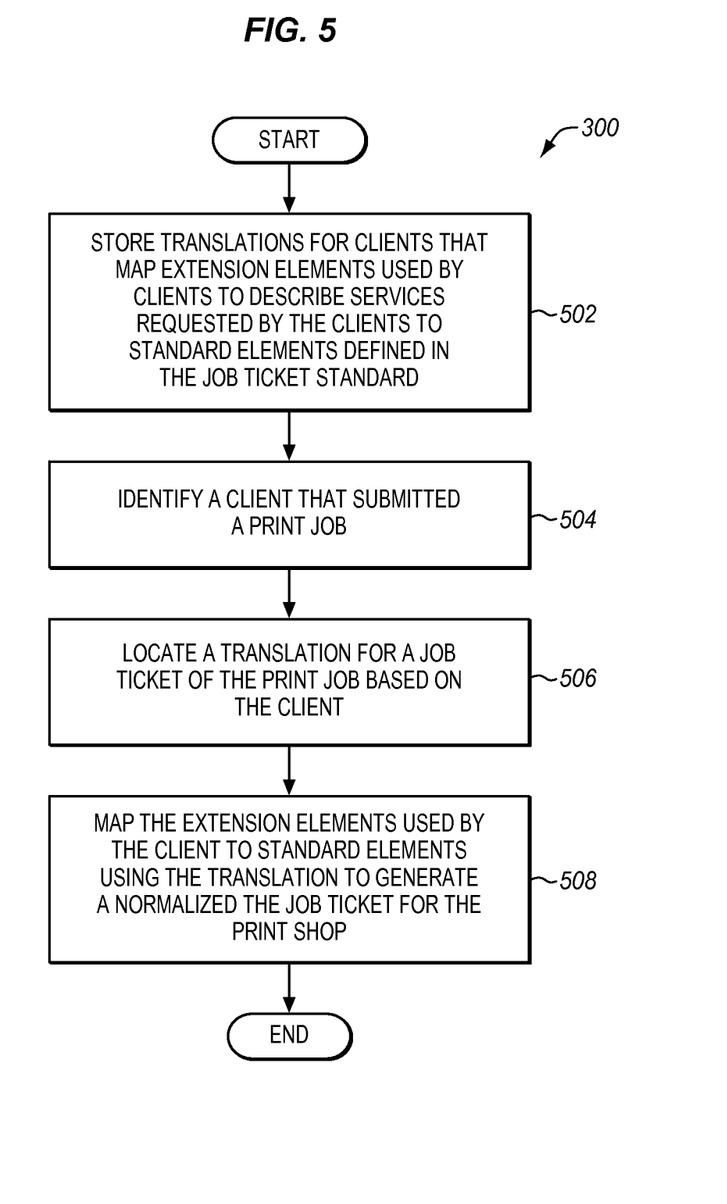
FIG. 5 is a flow chart illustrating even more additional details for the method of FIG. 3 in an exemplary embodiment.

FIG. 5 is a flow chart illustrating additional details for the method 300 of FIG. 3 in an exemplary embodiment. The steps illustrated in FIG. 5 will be described with respect to system 202 of FIG. 2, although one skilled in the art will understand that the steps may be performed by other systems not shown.

In step 502, translation system 206 stores translations for one or more clients 110-112. The translations map extension elements used by the one or more clients 110-112 to describe the services requested from architecture 102 to standard elements defined in the job ticket standard used by architecture 102. For example, translation system 206 may store a translation for client 110 in storage system 208. In the example, the translation for client 110 includes the extension elements typically used by client 110. Generally, the extension elements used by a particular client may be due to the particular software used when a client generates job tickets, etc.

In step 504, translation system 206 identifies a client that submitted a print job. In continuing with the example, translation system 206 may identify client 110 when processing a job ticket for a print job submitted by client 110.

In step 506, translation system 206 locates a translation for a job ticket of the print job in our example based on client 110. Translation system 206 locates a translation stored in storage system 208 for client 110. In step 508, translation system 206 maps the extension elements used by client 110 to standard elements using the translation. The use of a stored translation for one or more clients 110-112 allows architecture 102 provide a more customizable mapping between extension elements used by clients 110-112. For example, some clients 110-112 may prefer a specific mapping between the extension elements and the standardized elements in the job ticket standard used by architecture 102. In some cases, multiple mappings may be possible from an extension element to a plurality of standard elements. When a template is used to define the mappings, customer preferences may be taken into account when normalizing job tickets. In addition, the use of translations allows architecture 102 to "learn" and adapt to job tickets generated by clients 110-112 as discussed with respect to FIG. 5. Submission system 204 may then send the normalized job ticket to workflow generator 124 for generating a workflow based on the normalized job ticket.

Figure 6:
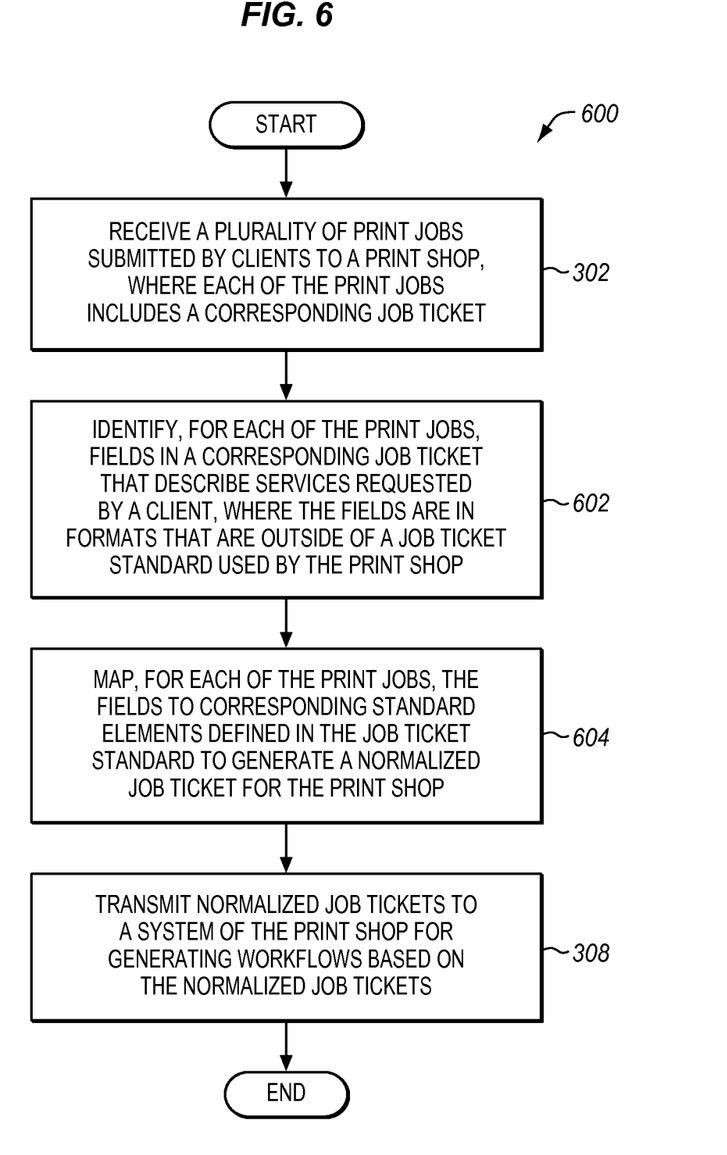
FIG. 6 is a flow chart illustrating another method of normalizing job tickets in an exemplary embodiment.

FIG. 6 is a flow chart illustrating another method 600 of normalizing job tickets in an exemplary embodiment. The steps illustrated in FIG. 6 will be described with respect to system 202 of FIG. 2, although one skilled in the art will understand that the steps may be performed by other systems not shown. In this embodiment, system 202 identifies fields in job tickets that describe services requested by clients. The fields in this embodiment are in formats that are outside of the job ticket standard used by architecture 102. In other words, the fields are not merely extensions to the job ticket standard, but instead are outside of the standard. This may result when job tickets are in XML formats not supported by JDF, binary formats, formats proprietary to a software application, etc. In this embodiment, system 202 maps the fields to standard elements defined in the job ticket standard used by architecture 102. For example, system 202 may map fields from a binary file to standard elements defined in JDF. This allows architecture 102 to normalize incoming job tickets that have been generated in nearly any format.

In step 302 of method 600, translation system 206 receives a plurality of print jobs. This step has been previously described with respect to method 300. In step 602, translation system 206 identifies fields in a corresponding job ticket. The fields are outside of a job ticket standard used by architecture 102. When identifying the fields, translation system 206 may analyze the job ticket to determine if specific tags or control codes in the job ticket are used to delineate the fields.

In step 604, translation system 206 maps the fields to corresponding standard elements in the job ticket standard used by architecture 102. This mapping results in a normalized job ticket for the print shop. In step 308 (see FIG. 3), submission system 204 transmits the normalized job ticket to a system of architecture 102 (e.g., workflow generator 124) for generating a workflow. The step has been previously described with respect to method 300.

EXAMPLE

Figure 7A:
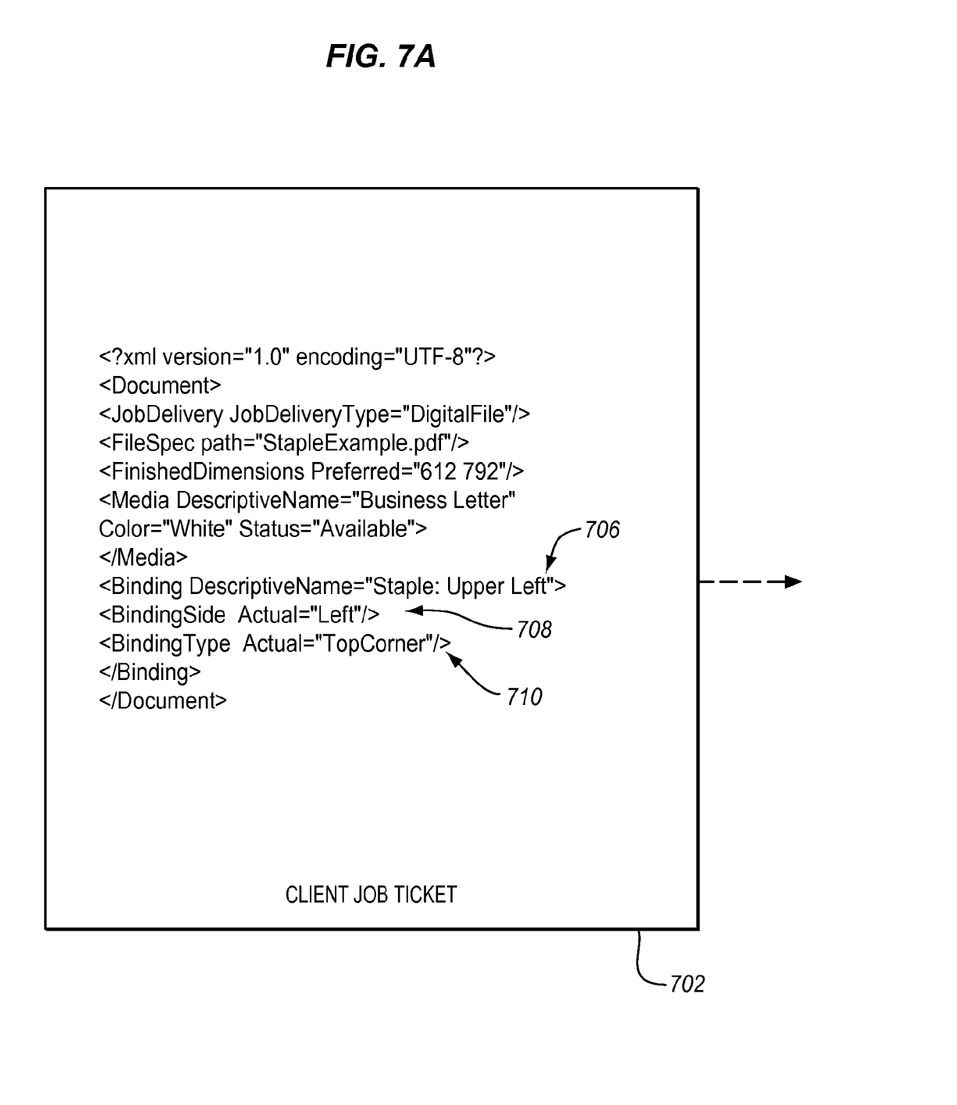

FIGS. 7A-7B are block diagrams illustrating an example of normalizing a client XML job ticket for a print request to a normalized JDF intent job ticket for the print request in an exemplary embodiment. Client ticket 702 of FIG. 7A in the example is an XML print request in a proprietary XML format. The XML for client ticket 702 includes a binding element 706. Binding element 706 is the XML description of a stapling service requested by the client. Binding element 706 includes elements 708 and 710 that describe the stapling is requested for the left top corner of the document.

When system 202 (see FIG. 2) receives client ticket 702, system 202 attempts to identify element 706 in client ticket 702 (and sub-elements 708 and 710). To do so, system 202 may retrieve a stored translation pertinent to client ticket 702. The translation may be based on a client submitting a job that includes client ticket 702, software used to generate client ticket 702, etc.

System 202 then generates a normalized JDF ticket 704 (see FIG. 7B). In this example, normalized JDF ticket 704 includes the normalized intent element BindingIntent 712. When normalizing client ticket 702, system 202 may map the sub-elements 708 and 710 in client ticket 702 to elements 714 and 716 in the JDF standard. After generating normalized JDF job ticket 704, system 202 provides ticket 704 to workflow generator 124. Workflow generator 124 may then create a workflow using ticket 704. The workflow may define specific steps or actions to perform at architecture 102 to achieve the JDF intent(s) described in ticket 704. To achieve the intent(s) workflow generator 124 may create one or more JDF processes for each JDF intent. For example, workflow server 124 may assign a stapling system to perform a JDF process after the JDF intent ticket is translated to JDF process.

Figure 8:
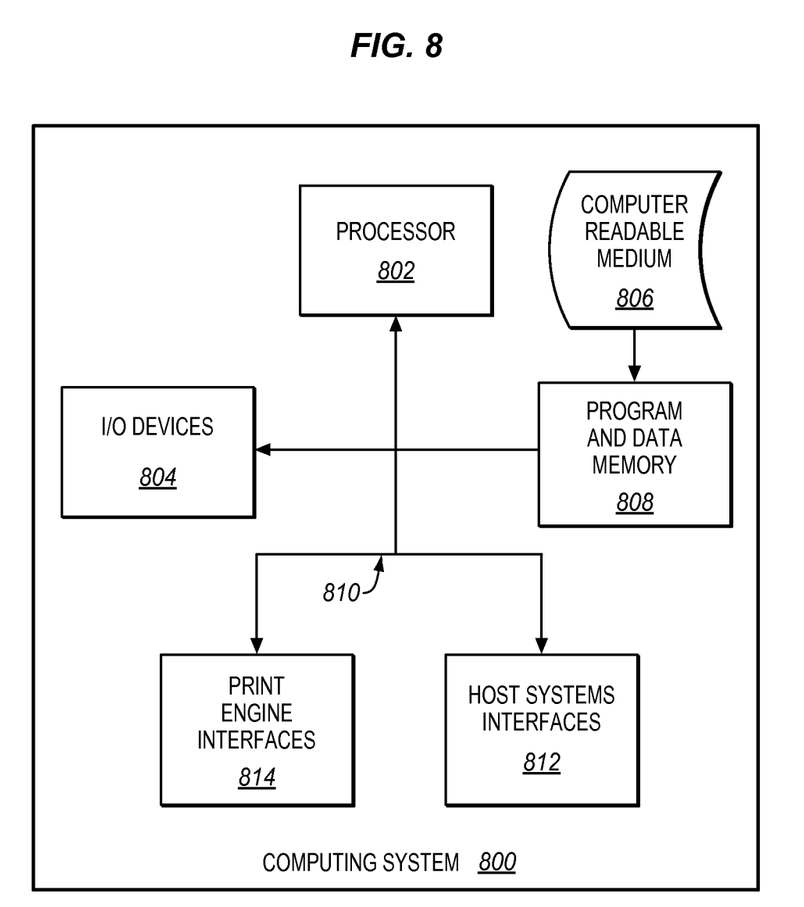
FIG. 8 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 800 in which a computer readable medium 806 may provide instructions for performing methods described herein in an exemplary embodiment.

Furthermore, the invention can take the form of a computer program product accessible from a computer-usable or computer-readable medium 806 providing program code for use by or in connection with a computer or any instruction execution system. For the purposes of this description, a computer-usable or computer readable medium 806 can be any apparatus that can contain, store, communicate, propagate, or transport the program for use by or in connection with the instruction execution system, apparatus, or device.

The medium 806 can be an electronic, magnetic, optical, electromagnetic, infrared, or semiconductor system (or apparatus or device) or a propagation medium. Examples of a computer-readable medium 806 include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

A data processing system suitable for storing and/or executing program code includes at least one processor 802 coupled directly or indirectly to memory 808 through a system bus 810. The memory 808 can include local memory employed during actual execution of the program code, bulk storage, and cache memories which provide temporary storage of at least some program code in order to reduce the number of times code is retrieved from bulk storage during execution.

Input/output or I/O devices 804 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 812, or remote printers or storage devices through intervening private or public networks, such as through print engine interfaces 814. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A system comprising:
a translation system configured to receive a plurality of print jobs submitted by clients to a print shop architecture, wherein each of the print jobs includes a corresponding job ticket,
for each of the print jobs, the translation system is further configured to identify extension elements in a corresponding job ticket that describe services requested by a client, wherein the extension elements are extensions to a job ticket standard used by the print shop architecture;
a storage system configured to store translations for clients that map the extension elements to standard elements defined in the job ticket standard,
wherein the translation system is further configured to identify a client that submitted a print job, to locate a translation in the storage system for a job ticket of the print job based on the client, and to map the extension elements used by the client to standard elements using the translation to generate a normalized job ticket; and
a submission system configured to transmit normalized job tickets to a system of the print shop architecture for generating workflows for the print jobs based on the normalized job tickets.

2. The system of claim 1 wherein:
the translation system is further configured to identify a failure to map an extension element in the job ticket to a standard element defined in the job ticket standard, to provide a notification to a print operator of the print shop architecture, to receive input from the print operator defining a correspondence between the extension element and the standard element, to generate a translation from the extension element to the standard element based on the input, and to store the translation for subsequent use when generating a normalized job ticket.

3. The system of claim 1 wherein:
the translation system is further configured to determine multiple possible mappings between an extension element in a job ticket and standard elements defined in the job ticket standard, to provide a notification to a print operator of the print shop architecture, to receive input from the print operator defining a correspondence between the extension element and one of the standard elements, to generate a translation from the extension element to the standard element based on the input, and to store the translation for subsequent use when generating a normalized job ticket.

4. The system of claim 1 wherein the job ticket standard used by the print shop architecture is Job Definition Format (JDF).

5. The system of claim 4 wherein:
the translation system is further configured to map a client's request for services in received job tickets to JDF intent to generate a normalized job ticket.

6. A method comprising:
receiving a plurality of print jobs submitted by clients to a print shop architecture, wherein each of the print jobs includes a corresponding job ticket;
identifying, for each of the print jobs, extension elements in a corresponding job ticket that describe services requested by a client, wherein the extension elements are extensions to a job ticket standard used by the print shop architecture;
storing translations for clients that map the extension elements to standard elements defined in the job ticket standard;
identifying a client that submitted a print job;
locating a translation for a job ticket of the print job based on the client,
wherein mapping further comprises:
mapping the extension elements used by the client to standard elements using the translation to generate a normalized job ticket; and
transmitting normalized job tickets to a system of the print shop architecture for generating workflows for the print jobs based on the normalized job tickets.

7. The method of claim 6 wherein:
identifying a failure to map an extension element in the job ticket to a standard element defined in the job ticket standard;
providing a notification to a print operator of the print shop architecture;
receiving input from the print operator defining a correspondence between the extension element and the standard element;
generating a translation from the extension element to the standard element based on the input; and
storing the translation for subsequent use when generating a normalized job ticket.

8. The method of claim 6 wherein:
determining multiple possible mappings between an extension element in a job ticket for a print job and standard elements defined in the job ticket standard;
providing a notification to a print operator of the print shop architecture;
receiving input from the print operator defining a correspondence between the extension element and one of the standard elements;
generating a translation from the extension element to the standard element based on the input; and
storing the translation for subsequent use when generating a normalized job ticket.

9. The method of claim 8 wherein the job ticket standard used by the print shop architecture is Job Definition Format (JDF).

10. The method of claim 9 wherein the step of mapping further comprises:
mapping a client's request for services to JDF intent to generate a normalized job ticket.

11. A system comprising:
a translation system configured to receive a plurality of print jobs submitted by clients to a print shop architecture, wherein each of the print jobs includes a corresponding job ticket,
for each of the print jobs, the translation system is further configured to identify fields in a corresponding job ticket that describe services requested by a client, wherein the fields are in formats that are outside of a job ticket standard used by the print shop architecture;
a storage system configured to store translations for clients that map the fields in the job tickets to standard elements defined in the job ticket standard,
wherein the translation system is further configured to identify a client that submitted a print job, to locate a translation in the storage system for a job ticket of the print job based on the client, to map fields in a job ticket of the print job to standard elements using the translation to generate a normalized job ticket; and
a submission system configured to transmit normalized job tickets to a system of the print shop architecture for generating workflows for the print job based on the normalized job tickets.

12. The system of claim 11 wherein:
the translation system is further configured to identify a failure to map a field in the job ticket to a standard element defined in the job ticket standard, to provide a notification to a print operator of the print shop architecture, to receive input from the print operator defining a correspondence between the field and the standard element, to generate a translation from the field to the standard element based on the input, and to store the translation for subsequent use when generating a normalized job ticket.

13. The system of claim 11 wherein:
the translation system is further configured to determine multiple possible mappings between a field in the job ticket and standard elements defined in the job ticket standard, to provide a notification to a print operator of the print shop architecture, to receive input from the print operator defining a correspondence between the field and one of the standard elements, to generate a translation from the field to the standard element based on the input, and to store the translation for subsequent use when generating a normalized job ticket.

14. The system of claim 11 wherein the job ticket standard used by the print shop architecture is Job Definition Format (JDF).

15. The system of claim 11 wherein the step of mapping further comprises:
mapping a client's request for services in a received job ticket to Job Definition Format (JDF) intent to generate a normalized job ticket.

16. The system of claim 15 wherein the services are non-printing activities comprising at least one of generating an email, generating a multi-media file, and shipping a printed output of the print job.

* * * * *